United States Patent
Machida et al.

(10) Patent No.: US 11,763,243 B2
(45) Date of Patent: Sep. 19, 2023

(54) PLANT OPERATION SUPPORT SYSTEM AND PLANT OPERATION SUPPORT METHOD

(71) Applicant: YOKOGAWA ELECTRIC CORPORATION, Musashino (JP)

(72) Inventors: Yuta Machida, Tokyo (JP); Ryosuke Kashiwa, Tokyo (JP); Hirotsugu Gotou, Tokyo (JP); Tomoya Hoshino, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 187 days.

(21) Appl. No.: 16/835,546

(22) Filed: Mar. 31, 2020

(65) Prior Publication Data
US 2020/0320448 A1    Oct. 8, 2020

(30) Foreign Application Priority Data
Apr. 2, 2019    (JP) .................................. 2019-070434

(51) Int. Cl.
*G06Q 10/067* (2023.01)
*G06F 30/20* (2020.01)
(Continued)

(52) U.S. Cl.
CPC ........... *G06Q 10/067* (2013.01); *G06F 30/20* (2020.01); *G06N 5/04* (2013.01);
(Continued)

(58) Field of Classification Search
CPC .......... G06Q 10/067; G06Q 10/06375; G06Q 50/06; G06Q 50/26; G06F 30/20; G06N 5/04
See application file for complete search history.

(56) References Cited

U.S. PATENT DOCUMENTS 6,408,227 B1 *   6/2002   Singhvi ................... C02F 1/008
                                                    700/266
2005/0240382 A1   10/2005  Nakaya et al.
(Continued)

FOREIGN PATENT DOCUMENTS

JP    07-112103 A    5/1995
JP    07-133899 A    5/1995
(Continued)

OTHER PUBLICATIONS

Bertone, Edoardo, Rodney A. Stewart, Hong Zhang, and Kelvin O'Halloran. "Hybrid water treatment cost prediction model for raw water intake optimization." Environmental Modelling & Software 75 (2016): 230-242 (Year: 2016).*
(Continued)

*Primary Examiner* — Chuen-Meei Gan
(74) *Attorney, Agent, or Firm* — Sughrue Mion, PLLC

(57) ABSTRACT

A plant operation support system supports an operation of a plant. The plant operation support system includes a fluctuation prediction device configured to predict a fluctuation of an element which is input to the plant, and a simulation device configured to simulate a behavior of the plant using a fluctuation of the element predicted by the fluctuation prediction device and data which is obtained from the plant.

18 Claims, 10 Drawing Sheets

(51) Int. Cl.
*G06N 5/04* (2023.01)
*G06Q 10/0637* (2023.01)
*G06Q 50/06* (2012.01)
*G06F 111/10* (2020.01)
*G06Q 50/26* (2012.01)

(52) U.S. Cl.
CPC ....... *G06Q 10/06375* (2013.01); *G06Q 50/06* (2013.01); *G06F 2111/10* (2020.01); *G06Q 50/26* (2013.01)

(56) References Cited

U.S. PATENT DOCUMENTS

| | | | | |
|---|---|---|---|---|
| 2013/0066475 | A1* | 3/2013 | Yokokawa | C02F 1/441 700/281 |
| 2014/0108314 | A1* | 4/2014 | Chen | G06N 5/048 706/20 |
| 2016/0364510 | A1* | 12/2016 | Kashiwa | G05B 17/02 |
| 2021/0039972 | A1* | 2/2021 | Kawata | C02F 3/308 |

FOREIGN PATENT DOCUMENTS

| | | | |
|---|---|---|---|
| JP | 2001-214470 | A | 8/2001 |
| JP | 2002-126721 | A | 5/2002 |
| JP | 2002-373002 | A | 12/2002 |
| JP | 2005-332360 | A | 12/2005 |
| JP | 2012-226731 | A | 11/2012 |
| JP | 2016-115289 | A | 6/2016 |
| JP | 2017056418 | A * | 3/2017 |
| WO | WO-2021211053 | A1 * | 10/2021 |

OTHER PUBLICATIONS

Beck, M. B. "Identification, estimation and control of biological waste-water treatment processes." In IEE Proceedings D (Control Theory and Applications), vol. 133, No. 5, pp. 254-264. IET Digital Library, 1986 (Year: 1986).*

Maleki, Afshin, Simin Nasseri, Mehri Solaimany Aminabad, and Mahdi Hadi. "Comparison of ARIMA and NNAR models for forecasting water treatment plant's influent characteristics." KSCE Journal of Civil Engineering 22, No. 9 (2018): 3233-3245 (Year: 2018).*

Yu, Tingting, Shuai Yang, Yun Bai, Xu Gao, and Chuan Li. "Inlet water quality forecasting of wastewater treatment based on kernel principal component analysis and an extreme learning machine." Water 10, No. 7 (2018): 873. 17 pages (Year: 2018).*

Zhang, Jin, Xiaohui Zhu, Yong Yue, and Prudence WH Wong. "A real-time anomaly detection algorithm/or water quality data using dual time-moving windows." In 2017 Seventh international conference on innovative computing technology (INTECH), pp. 36-41. IEEE, 2017 (Year: 2017).*

Zhao, Huijun, Roger O'Halloran, Melissa Winnel, Shanqing Zhang, Trang Nguyen, Peter J. Toscas, and Nigel Goodman. A Real-Time Water Quality Information Acquisition System for Wastewater Source Control. Urban Water Security Research Alliance, 2012. 58 pages (Year: 2012).*

Kim, Chan Moon, and Manukid Parnichkun. "Prediction of settled water turbidity and optimal coagulant dosage in drinking water treatment plant using a hybrid model of k-means clustering and adaptive neuro-fuzzy inference system." Applied Water Science 7, No. 7 (2017): 3885-3902 (Year: 2017).*

* cited by examiner

PLANT OPERATION SUPPORT SYSTEM AND PLANT OPERATION SUPPORT METHOD

BACKGROUND

Technical Fields

The present invention relates to a plant operation support system and a plant operation support method.

Priority is claimed on Japanese Patent Application No. 2019-070434, filed on Apr. 2, 2019, the contents of which are incorporated herein by reference.

Related Art

In chemical plants for petroleum refining or the like, water treatment plants, and other plants, plant operation support devices for supporting the operation of plants are sometimes used. One such plant operation support device may predict the state of a plant (for example, disturbance or water quality) from the current point in time to a certain point in time in the future using various types of data obtained in the past. Japanese Unexamined Patent Application Publication No. 2002-373002, Japanese Unexamined Patent Application Publication No. 2001-214470, Japanese Unexamined Patent Application Publication No. H07-112103, and Japanese Unexamined Patent Application Publication No. 2002-126721 disclose such plant operation support devices of the related art.

In addition, as another plant operation support device, a device which is connected to an actual plant and supports its operation on-line while simulating the actual plant has also been proposed. This plant operation support device performs a simulation in parallel with the operation of an actual plant while correcting a simulation model when necessary on the basis of actual data obtained from the actual plant. Such a plant operation support device is referred to as a so-called tracking simulator, and is disclosed in, for example, Japanese Unexamined Patent Application Publication No. 2005-332360.

Incidentally, in a case where conditions (such as temperature, pressure, or composition) of a raw material that flows into a plant are constant, the plant operation support devices disclosed in Japanese Unexamined Patent Application Publication No. 2002-373002, Japanese Unexamined Patent Application Publication No. 2001-214470, Japanese Unexamined Patent Application Publication No. H07-112103, Japanese Unexamined Patent Application Publication No. 2002-126721, and Japanese Unexamined Patent Application Publication No. 2005-332360 can simulate the behavior of the plant with a high degree of accuracy to a certain extent. However, the plant operation support devices disclosed in Japanese Unexamined Patent Application Publication No. 2002-373002, Japanese Unexamined Patent Application Publication No. 2001-214470, Japanese Unexamined Patent Application Publication No. H07-112103, Japanese Unexamined Patent Application Publication No. 2002-126721, and Japanese Unexamined Patent Application Publication No. 2005-332360 have a problem in that the fluctuation of conditions of a raw material that flows into a plant leads to deterioration in the degree of accuracy with which the behavior of the plant is simulated. This problem may also occur in a case where energy (for example, electric power) or the like which is input to a plant fluctuates. That is, the fluctuation of an element which is input to a plant gives rise to the problem of deterioration in the degree of accuracy with which the behavior of the plant is simulated.

SUMMARY

A plant operation support system may support an operation of a plant. The plant operation support system may include a fluctuation prediction device configured to predict a fluctuation of an element which is input to the plant, and a simulation device configured to simulate a behavior of the plant using a fluctuation of the element predicted by the fluctuation prediction device and data which is obtained from the plant.

Further features and aspects of the present disclosure will become apparent from the following detailed description of exemplary embodiments with reference to the attached drawings.

DETAILED DESCRIPTION OF THE EMBODIMENTS

Figure 1:
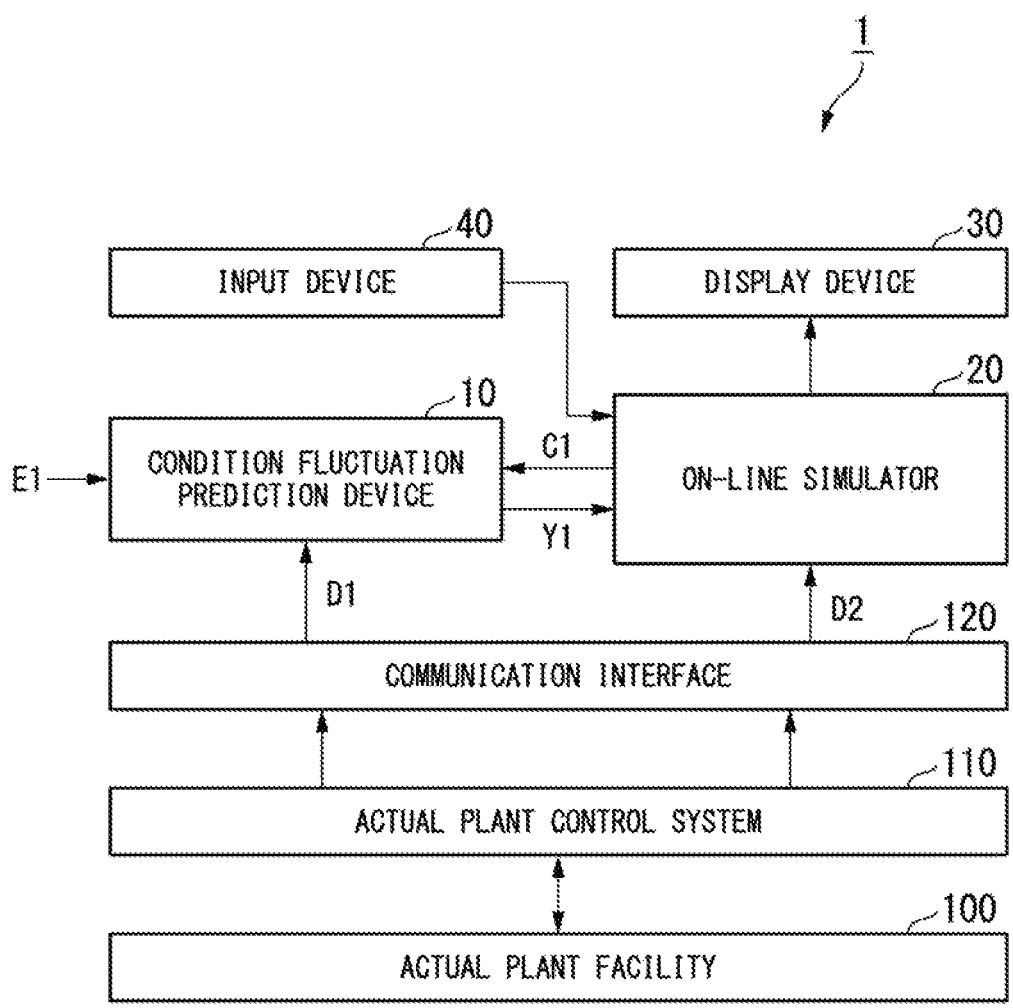
FIG. 1 is a block diagram illustrating a schematic configuration of a plant operation support system according to an embodiment of the present invention.

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide a plant operation support system and a plant operation support method that make it possible to simulate the behavior of a plant with a high degree of accuracy even in a case where an element which is input to the plant fluctuates.

Hereinafter, a plant operation support system and a plant operation support method according to an embodiment of the present invention will be described in detail with reference to the accompanying drawings. Below, an outline of an embodiment of the present invention will first be described, and then the details of the embodiment of the present invention will be described.

Outline

The embodiment of the present invention involves the capability of simulating the behavior of a plant with a high degree of accuracy even in a case where an element which is input to the plant fluctuates. Meanwhile, for the purpose of facilitating understanding, an element which is input to a plant will be assumed below to be a raw material that flows into the plant. That is, an example in which it is possible to simulate the behavior of a plant with a high degree of accuracy even in a case where conditions of a raw material that flows into the plant (hereinafter referred to as "raw material conditions" in some cases) fluctuate will be described.

Here, for example, the plant operation support devices disclosed in Japanese Unexamined Patent Application Publication No. 2002-373002, Japanese Unexamined Patent Application Publication No. 2001-214470, Japanese Unexamined Patent Application Publication No. H07-112103, Japanese Unexamined Patent Application Publication No. 2002-126721, and Japanese Unexamined Patent Application Publication No. 2005-332360 are constructed under the assumption that "conditions of a raw material that flows into a plant (such as temperature, pressure, or composition) are constant." The plant operation support devices constructed under such an assumption can be applied without any problems in a plant in which raw material conditions hardly fluctuate. However, it is difficult for such plant operation support devices to simulate the behavior of a plant with a good degree of accuracy in a plant in which raw material conditions fluctuate.

Examples of plants in which the above-described raw material conditions hardly fluctuate include a chemical plant, a liquefied natural gas (LNG) plant, and the like. Examples of plants in which the above-described raw material conditions fluctuate include upstream in the petroleum industry (a plant that manages and controls a wellhead such as a gas field or an oil field, or the surroundings), a water treatment plant, and the like. Particularly, in the latter examples of plants (upstream in the petroleum industry and a water treatment plant), it is known that raw material conditions fluctuate in real time.

Here, for example, in a water treatment plant, in a case where the quality of raw water which is a raw material (such as, for example, turbidity, pH, or alkalinity) fluctuates, the fluctuation of the quality of raw water (raw material condition) has a direct influence on the quality of water within a plant facility, and the quality of water within a plant facility changes with time. For this reason, in order to accurately simulate the behavior of a plant facility, it is necessary to simulate the behavior inclusive of the fluctuation of raw material conditions.

In addition, in the plant operation support device disclosed in Japanese Unexamined Patent Application Publication No. 2005-332360, in a case where raw material conditions fluctuate, the behavior of a plant cannot be accurately simulated, and a defect of the accuracy of simulation decreasing greatly is caused. In order to avoid such a defect, for example, measuring raw material composition using a liquid chromatograph or the like and reflecting the measurement result in simulation can be considered. However, a liquid chromatograph is not appropriate for simulation in real time because it takes time until the measurement result is obtained, and incurs high costs.

In addition, in the plant operation support device disclosed in Japanese Unexamined Patent Application Publication No. 2005-332360, simulation is performed with raw material conditions at the current time kept constant. Therefore, in a case where the raw material conditions fluctuate in an actual plant, the fluctuation is not reflected in the simulation result. As a result, deviation occurs between a prediction result obtained in the simulation and the state of an actual plant, and the prediction result of the simulation is unreliable.

In the embodiment of the present invention, the fluctuation of conditions of a raw material that flows into a plant is predicted. The behavior of the plant is simulated using the predicted fluctuation of the raw material conditions and data obtained from the plant. Thereby, it is possible to simulate the behavior of a plant with a high degree of accuracy even in a case where conditions of a raw material that flows into the plant fluctuate.

Embodiment

<Configuration of Plant Operation Support System>

FIG. 1 is a block diagram illustrating a schematic configuration of a plant operation support system according to an embodiment of the present invention. As shown in FIG. 1, a plant operation support system 1 of the present embodiment includes a condition fluctuation prediction device 10 (fluctuation prediction device), an on-line simulator 20 (simulation device), a display device 30, and an input device 40. Such a plant operation support system 1 supports the operation of a plant by simulating the behavior of the plant in consideration of the fluctuation of conditions of a raw material that flows into the plant.

First, before the configuration of the plant operation support system 1 is described, a plant of which the operation is supported by the plant operation support system 1 will be described. The plant is provided with an actual plant facility 100, an actual plant control system 110, and a communication interface 120. The actual plant facility 100 includes various types of instruments, devices, or facilities installed in the plant. The actual plant facility 100 also includes a field instrument. The field instrument is, for example, a sensor instrument such as a flowmeter or a temperature sensor, a valve instrument such as a flow rate control value or an on-off value, an actuator instrument such as a fan or a motor, or an instrument installed on site at another plant.

The actual plant control system 110 is, for example, a system that controls the actual plant facility 100 on the basis of an instruction of an operator of the plant. This actual plant control system 110 may be a process control system such as, for example, a distributed control system (DCS). That is, the actual plant control system 110 may acquire detection results of a plurality of sensors (such as flowmeters or thermometers), operate an actuator by obtaining the amount of operation of the actuator in accordance with the detection results, and control various state quantities (such as, for example, pressure, temperature, or flow rate) in a process.

The communication interface 120 is an interface for realizing communication between the actual plant control system 110 and various devices located at a higher level of the actual plant control system 110. Here, examples of the various devices located at the higher level of the actual plant control system 110 include a terminal device which is operated by the operator of the plant, or the like, with the exception of the condition fluctuation prediction device 10 and the on-line simulator 20 of the plant operation support system 1. As this communication interface 120, OLE for process control (OPC), which is a standard in process control, can be used.

Meanwhile, examples of the plant of which the operation is supported by the plant operation support system 1 include a chemical plant for refining petroleum or the like or a water treatment plant. Aside from these plants, an industrial plant, a plant that manages and controls a wellhead such as a gas field or an oil field, or the surroundings, a plant that manages and controls power generation such as hydraulic power, thermal power, or nuclear power, a plant that manages and controls energy harvesting such as sunlight or wind power, a plant that manages and controls water supply and sewerage or a dam, and the like can be used.

Next, the configuration of the plant operation support system 1 will be described. The condition fluctuation prediction device 10 of the plant operation support system 1 predicts the fluctuation of conditions of a raw material that flows into the plant using data relating to fluctuation components, and outputs prediction data Y1 indicating the prediction result to the on-line simulator 20. Here, the above data relating to fluctuation components includes data D1 relating to the condition fluctuation of a raw material obtained from the plant and data E1 influencing a process in the plant obtained from outside the plant. Meanwhile, an example of the data E1 includes data indicating the weather or data relating to environmental fluctuation components such as damage, construction, or a restoration situation of an external facility of the plant.

Figure 2:
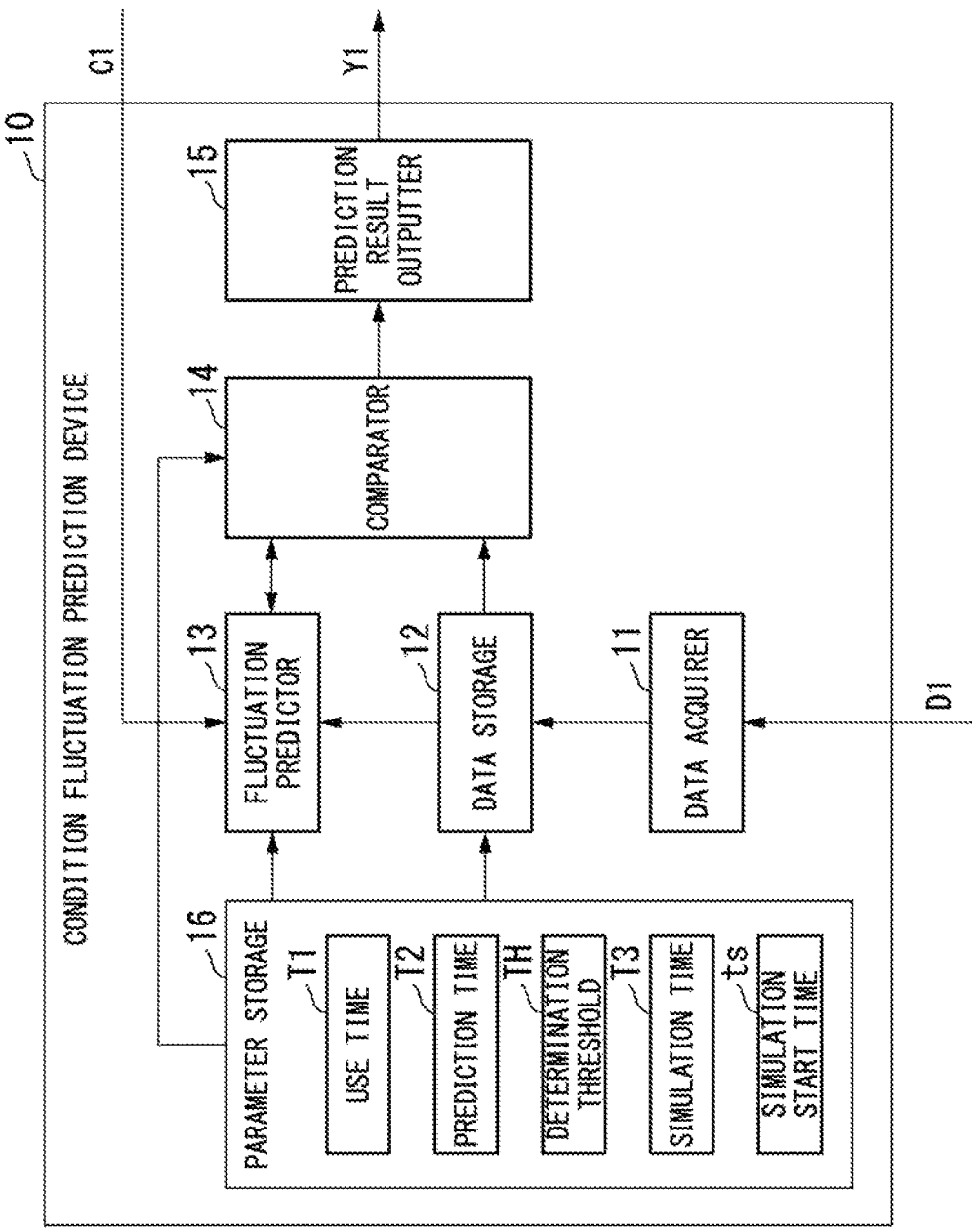
FIG. 2 is a block diagram illustrating main components of a condition fluctuation prediction device included in the plant operation support system according to an embodiment of the present invention.

FIG. 2 is a block diagram illustrating main components of a condition fluctuation prediction device included in the plant operation support system according to an embodiment of the present invention. As shown in FIG. 2, the condition fluctuation prediction device 10 includes a data acquirer 11, a data storage 12, a fluctuation predictor 13, a comparator 14, a prediction result outputter 15, and a parameter storage 16.

The data acquirer 11 communicates with the actual plant control system 110 through the communication interface 120, and acquires a process value (actual measurement value) required for predicting the fluctuation of raw material conditions as the data D1. In addition, the data acquirer 11 acquires data from outside the plant such as an external facility of the plant or the weather, as necessary, as the data E1. The data storage 12 stores the data D1 and the data E1 which are acquired in the data acquirer 11.

The fluctuation predictor 13 predicts the fluctuation of raw material conditions by performing statistical processing specified in advance using all or some of the data stored in the data storage 12. An example of the statistical processing which is performed by the fluctuation predictor 13 includes processing using a Kalman filter. Meanwhile, the statistical processing which is performed by the fluctuation predictor 13 is not limited to the processing using a Kalman filter and may be processing such as a moving average or a multi-variate analysis (multiple regression analysis).

Figure 3A:
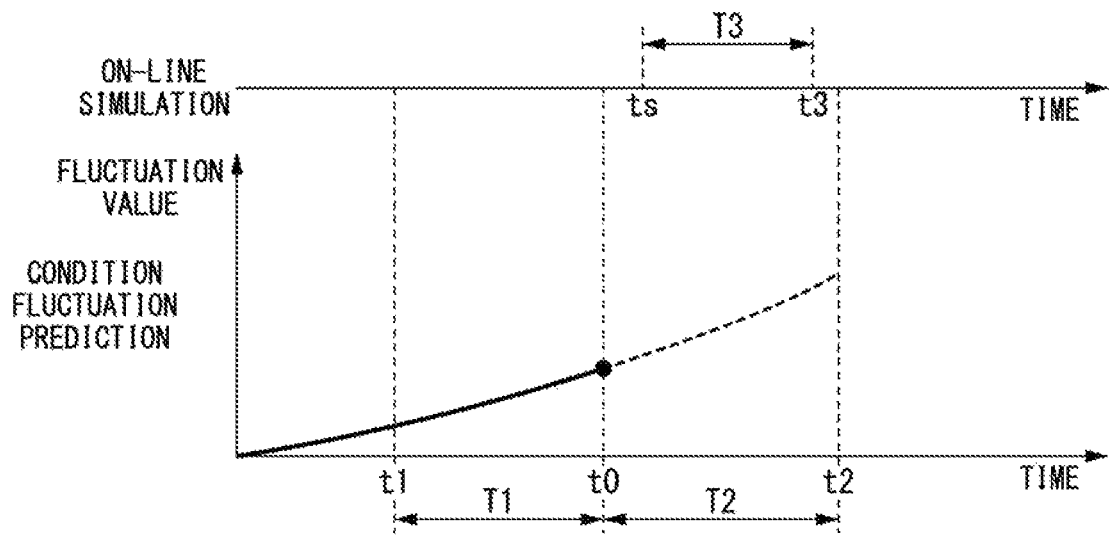
FIG. 3A is a diagram illustrating processing which is performed in the condition fluctuation prediction device in an embodiment of the present invention.
Figure 3B:
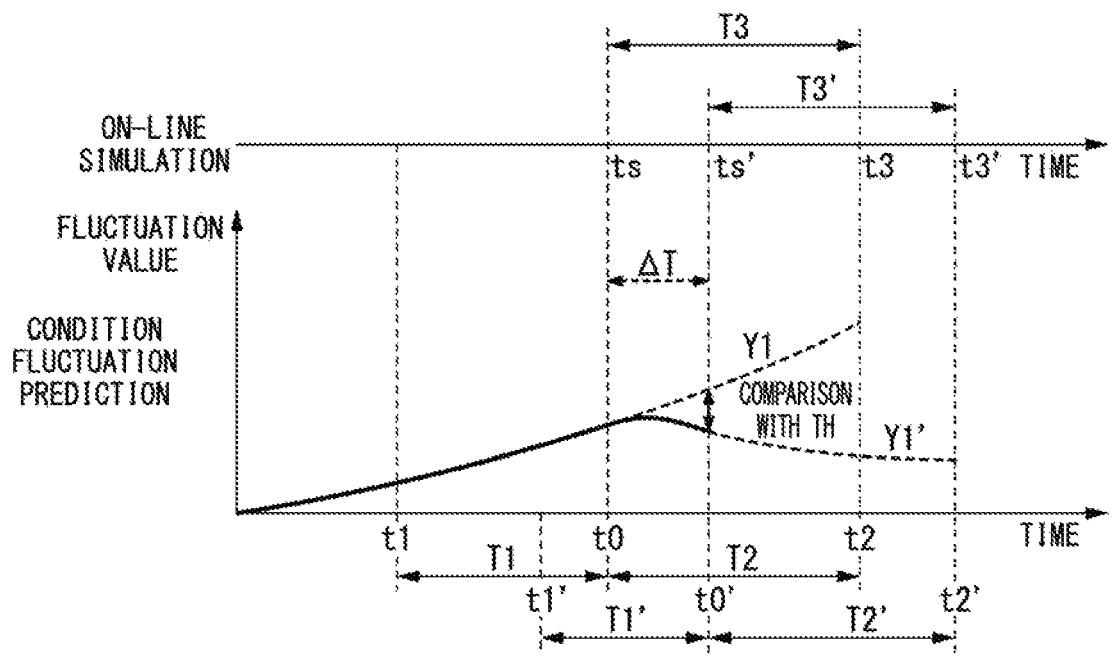
FIG. 3B is a diagram illustrating processing which is performed in the condition fluctuation prediction device in an embodiment of the present invention.

As shown in FIG. 3A, the fluctuation predictor 13 performs the above-described statistical processing using data from a current point in time t0 to a point in time t1 traced back to a use time T1 (a first time) stored in the parameter storage 16 among the data stored in the data storage 12. The fluctuation predictor 13 predicts the fluctuation of raw material conditions from the current point in time t0 to a point in time t2 ahead by a prediction time T2 (a second time) stored in the parameter storage 16. The solid line portion in the graph represents an actual measurement value, and the dotted line portion represents a prediction value. FIGS. 3A and 3B are diagrams illustrating processing which is performed in the condition fluctuation prediction device in an embodiment of the present invention.

The above use time T1 is set arbitrarily. For example, the use time T1 and the prediction time T2 may be set to be the same time (for example, 30 minutes), or may be set to be different times. In a case where the use time T1 and the prediction time T2 are set to be different times, the use time T1 may be set to be longer than the prediction time T2, or the use time T1 may be set to be shorter than the prediction time T2.

Here, the target period of simulation in the on-line simulator 20 is set from a simulation start time ts to a point in time t3 ahead by a simulation time T3 as shown in FIG. 3A. The simulation start time ts may be coincident with the current point in time t0, or may be a time after the current point in time t0. Meanwhile, for the purpose of simplifying the description, the simulation start time ts is assumed below to be coincident with the current time to. The simulation time T3 is set to be equal to or less than the prediction time T2 so that the end point in time of the simulation (the point in time t3) does not exceed the prediction end point in time of the raw material conditions (the point in time t2). For example, the simulation time T3 can be set arbitrarily as 5 minutes, 10 minutes, 30 minutes, 60 minutes, or the like.

The above simulation time T3 and simulation start time ts which are used in the on-line simulator 20 are stored in the parameter storage 16 together with the use time T1 and the prediction time T2 which are used in the fluctuation predictor 13. The use time T1, the prediction time T2, the simulation time T3, and the simulation start time ts are input from, for example, the input device 40 to the on-line simulator 20, and are output from the on-line simulator 20 to the condition fluctuation prediction device 10 as setting data C1. Meanwhile, the use time T1, the prediction time T2, the simulation time T3, and the simulation start time ts may be input directly from the input device 40 to the condition fluctuation prediction device 10.

Since the prediction data of fluctuation components of raw material conditions is required as the material of simulation, a result is required to be transferred to the simulator after calculation is terminated at a point in time before the start of the simulation. On the occasion of a loss of the condition fluctuation prediction data in the prediction time T2 (such as, for example, a failure in prediction, a case where calculation is not performed in time during re-execution of prediction or the like, or a communication error), the most recently calculated prediction data which is assumed to be a close value may be used, or processing for tentatively returning to a fixed value may be performed.

The fluctuation predictor 13 changes a method of predicting the fluctuation of raw material conditions in accordance with the comparison result of the comparator 14. Specifically, the fluctuation predictor 13 changes a method of predicting the fluctuation of raw material conditions in order to restart a prediction in a case where a difference between the prediction result of the fluctuation of raw material conditions and the actual measurement value of raw material conditions is larger than a determination threshold TH (threshold) stored in the parameter storage 16 on the basis of the comparison result of the comparator 14. For example, a change of a statistical method, a change of a time range (a sampling time of the use time T1), or the like may be performed. Meanwhile, what is to be compared is a tuning at which an actual measurement value within the corresponding prediction time T2 is obtained after the prediction of raw material conditions.

As shown in FIG. 3B, a case where the actual measurement value of raw material conditions (the solid line portion in the graph) is obtained after the elapse of time ΔT from a point in time at which the fluctuation of raw material conditions is predicted (current point in time t0) is considered. In such a case, when a difference between the actual measurement value and the prediction value Y1 is assumed to be larger than the determination threshold TH, the fluctuation predictor 13 changes a method of predicting the fluctuation of raw material conditions. In the example shown in FIG. 3B, the fluctuation predictor 13 changes the use time T1 to a use time T1' shorter than the use time T1, and recalculates a prediction value Y1' from a current point in time t0' to a point in time t2' ahead by a prediction time T2'.

Meanwhile, in the example shown in FIG. 3B, the on-line simulator 20 executes a simulation from the current point in time t0' (simulation start time ts') to a point in time t3' ahead by a simulation time T3' using the prediction value Y1'. Here, the prediction time T2 and the prediction time T2' may be equal to each other, and the simulation time T3 and the simulation time T3' may be equal to each other. Alternatively, in order to maintain an interval between the point in time t0 and the point in time t2 constant, a time obtained by subtracting time ΔT from the prediction time T2 may be set to the prediction time T2', and a time obtained by subtracting time ΔT from the simulation time T3 may be set to the simulation time T3'. In addition, as a method of changing a prediction method for the fluctuation of raw material conditions, a method of prediction calculation may be changed with the exception of a change of the use time T1 (such as, for example, a change from extrapolation based on moving average to a multiple regression analysis).

In addition, the fluctuation predictor 13 may change a method of predicting the fluctuation of raw material conditions in accordance with the setting data C1 which is input from the input device 40 (or set in advance), or output from the on-line simulator 20. Meanwhile, the setting data C1 is data including the setting content of a simulation range in the on-line simulator 20. For example, it is the prediction time T2 including the simulation time T3 which is a target for simulation. In this case, the fluctuation predictor 13 may change the use time T1 with reference to the prediction time T2 included in the setting data C1.

As described above, the period of the prediction time T2 can be set arbitrarily. For example, an operator may appropriately input "perform one hour of simulation from now (or, after 30 minutes)" from the input device 40, or the period may be set in advance so that a simulation is performed every 30 minutes. Before these simulations are started, the fluctuation of raw material conditions is predicted in the condition fluctuation prediction device 10 (the fluctuation predictor 13), but this time range may be input from the input device 40 by an operator similarly, or may be set in advance. In addition, the time range may be set to perform a simulation only during the simulation time T3 from the start time is in the prediction time T2.

Regarding a relationship between the prediction time T2 and the use time T1, similarly for one hour of simulation, one hour (T2=T1), 30 minutes which is a shorter time (T2>T1), 90 minutes which is a longer time (T2<T1), and the like may be appropriately selected by an operator's determination (input from the input device 40), or advance setting.

Figure 4:
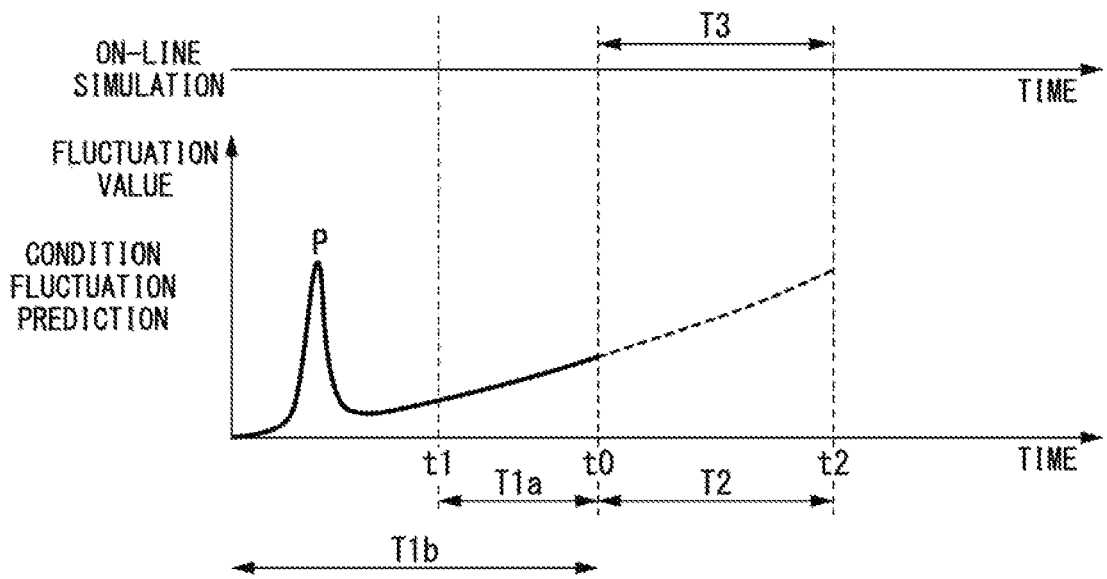
FIG. 4 is a diagram illustrating a setting example of a period of use in an embodiment of the present invention.

When the use time T1 is set longer, the accuracy of prediction does not necessarily increase. For example, as shown in FIG. 4, a case where an irregular peak P is present in the actual measurement value of a raw material or the like is also assumed. In such a case, whether this peak P is included depending on the setting range of the use time T1 influences the prediction result. The use time T1 may be set to a long use time T1*b* deliberately in a case where prediction has to be performed inclusive of this peak P, but the use time T1 has to be set to a short use time T1*a* so that this peak P is not included in a case where the prediction is adversely influenced due to this peak P being included. FIG. 4 is a diagram illustrating a setting example of a period of use in an embodiment of the present invention.

The operation of the fluctuation prediction device 10 (such as the situation of the actual measurement value or the prediction value of a raw material or the like, or the set length of the use time T1 or the prediction time T2) is caused to be displayed on the display device 30 shown in FIG. 1, so that an operator appropriately set and change the period of the use time T1 while visually recognizing a situation, or in a case where the fluctuation of an (irregular) actual measurement value equal to or greater than a threshold is present due to software processing or the like within the fluctuation prediction device, T1 may be set in a period in which this fluctuation is excluded. In this manner, the reason for the fluctuation predictor 13 to change a time range for predicting the fluctuation of raw material conditions is because the degree of accuracy of execution in the simulation of the on-line simulator 20 is improved.

Here, in a case where the time range for predicting the fluctuation of raw material conditions and the simulation range set in the on-line simulator 20 are different from each other, the fluctuation predictor 13 predicts the fluctuation of raw material conditions by adjusting the time range for predicting the fluctuation of raw material conditions with respect to the simulation range. It is assumed that the time range for predicting the fluctuation of raw material conditions is set to a time range from the current point in time t0 in FIG. 3B to the point in time t2 ahead by the prediction time T2, and that the simulation range is set to a time range from the simulation start time ts' in FIG. 3B to the point in time t3' ahead by the simulation time T3'. Then, the prediction result of the fluctuation of raw material conditions is not present between the point in time t2 and the point in time t3'.

In this manner, in a case where there is a portion in which the prediction result of the fluctuation of raw material conditions is not present in the simulation range set in the on-line simulator 20, a simulation cannot be executed in the on-line simulator 20. In order to enable the simulation of the on-line simulator 20 to be executed, the fluctuation predictor 13 changes the time range for predicting the fluctuation of raw material conditions so as to be coincident with the simulation range of the on-line simulator 20.

The comparator 14 compares the prediction result of the fluctuation of raw material conditions obtained in the fluctuation predictor 13 with the actual measurement value of raw material conditions. Specifically, the comparator 14 determines whether a difference between the above prediction result and the above actual measurement value is equal to or less than the determination threshold TH stored in the parameter storage 16. In a case where it is determined that the above difference is larger than the determination threshold TH, the comparator 14 outputs a determination result indicating to that effect to the fluctuation predictor 13. On the other hand, in a case where it is determined that the above difference is equal to or less than the determination threshold TH, the comparator 14 outputs the prediction result of the fluctuation of raw material conditions obtained in the fluctuation predictor 13 to the prediction result outputter 15.

The prediction result outputter 15 converts the prediction result of the fluctuation of raw material conditions obtained in the fluctuation predictor 13, as necessary, into a format appropriate to the on-line simulator 20 and outputs the converted format as the prediction data Y1. The prediction result outputter 15 converts, for example, the prediction result of the fluctuation of raw material conditions obtained in the fluctuation predictor 13 into a data array in which time data and the prediction result are associated with each other and outputs the converted data array as the prediction data Y1.

The parameter storage 16 stores various parameters which are used in the condition fluctuation prediction device 10. Specifically, the parameter storage 16 stores the use time T1 and the prediction time T2 which are used in the fluctuation predictor 13, the determination threshold TH which is used in the comparator 14, and the simulation time T3 and the simulation start time ts which are used in the on-line simulator 20. The use time T1, the prediction time T2, and the determination threshold TH can be individually set. Meanwhile, the use time T1 can be referred to as a time in which the range of data which is used for the prediction of the fluctuation of raw material conditions is specified. In addition, the prediction time T2 can be referred to as a time in which a range for predicting the fluctuation of raw material conditions is specified.

The on-line simulator 20 of the plant operation support system 1 simulates the behavior of a plant using the prediction data Y1 which is output from the condition fluctuation prediction device 10 and data D2 which is obtained from the plant, and outputs the result to the display device 30. Specifically, the on-line simulator 20 acquires the prediction data Y1 which is output from the condition fluctuation prediction device 10. In addition, the on-line simulator 20 communicates with the actual plant control system 110 through the communication interface 120, and acquires a process value, a PID set value, the amount of operation, and the like which are required for simulating the behavior of a plant as the data D2. The on-line simulator 20 simulates the behavior of a plant on-line using the acquired prediction data Y1 and the acquired data D2, and outputs the simulation result to the display device 30.

Here, the on-line simulator 20 in the present embodiment is different from those of the related art, in that the behavior of a plant is simulated using the prediction data Y1 which is output from the condition fluctuation prediction device 10 with the exception of the data D2 which is obtained from the plant. However, the simulation which is performed in the on-line simulator 20 is basically the same as those of the related art. For example, a simulation is performed using the same method as the method disclosed in Japanese Unexamined Patent Application Publication No. 2005-332360. Therefore, the details of a simulation method in the on-line simulator 20 will not be described.

The display device 30 displays a simulation result which is output from the on-line simulator 20. For example, the display device 30 includes a liquid crystal display panel or an organic electro luminescence (EL) display panel, and numerically displays a simulation result which is output from the on-line simulator 20, or displays the simulation result in a graph format. Meanwhile, the display device 30 may be, for example, a display device provided in a terminal device which is operated by an operator of a plant.

<Operation of Plant Operation Support System>

Figure 5:
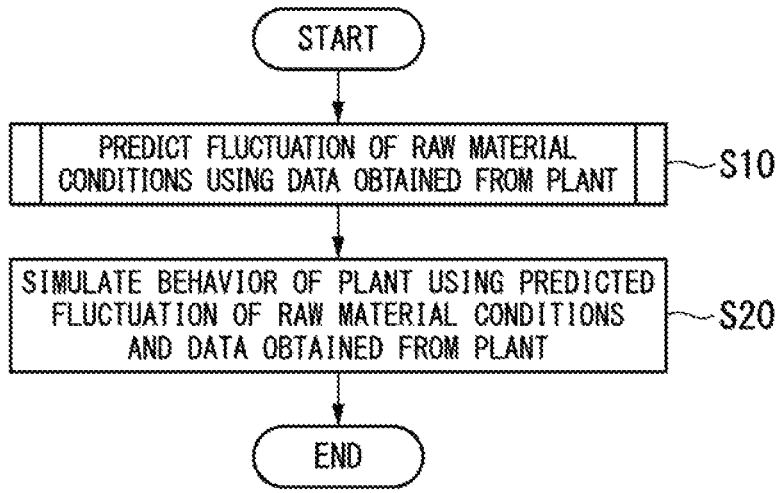
FIG. 5 is a flow chart illustrating an operation example of the plant operation support system according to an embodiment of the present invention.

FIG. 5 is a flow chart illustrating an operation example of the plant operation support system according to an embodiment of the present invention. The flow chart shown in FIG. 5 is repeatedly performed at fixed time intervals at which fluctuation component data is measured (appropriately based on, for example, the use time T1, the prediction time T2, or the like). When the process of the flow chart shown in FIG. 5 is started, first, a process of predicting the fluctuation of raw material conditions using data relating to fluctuation components which are obtained from a plant, the outer portion of the plant, or the like is performed in the condition fluctuation prediction device 10 (step S10: a first step).

Figure 6:
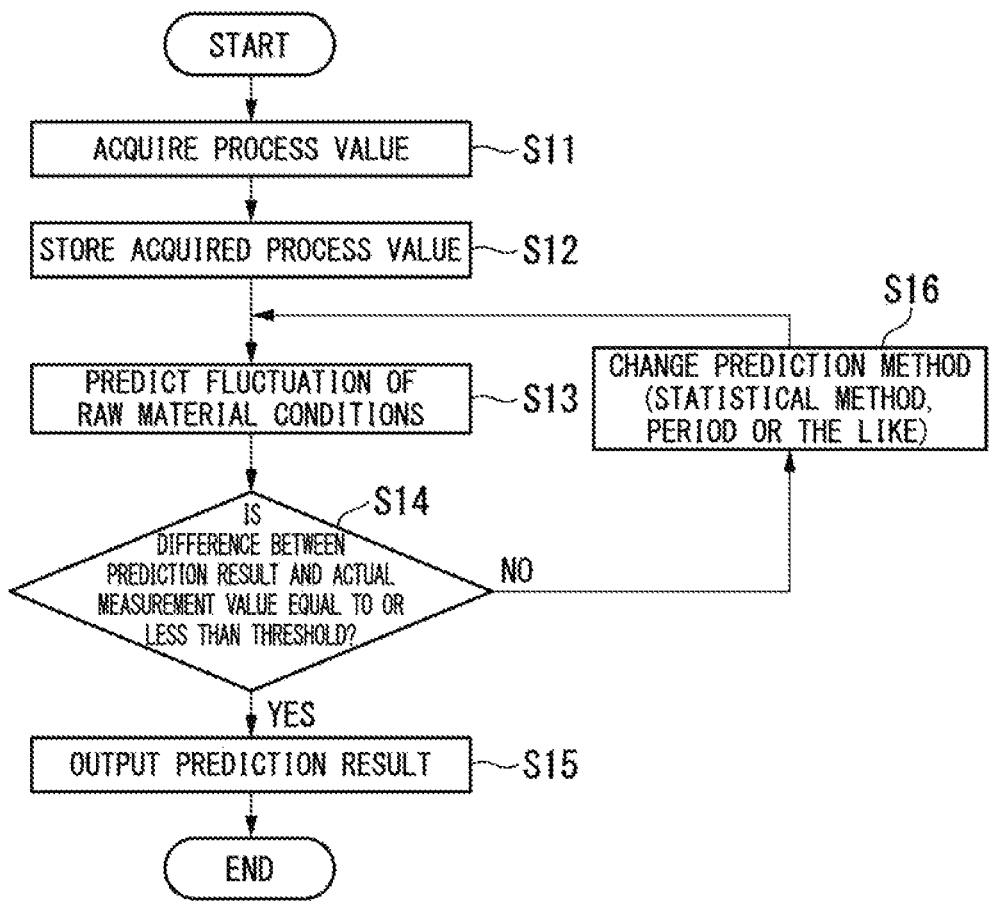
FIG. 6 is a flow chart illustrating the details of a process of step S10 in FIG. 5.

FIG. 6 is a flow chart illustrating the details of the process of step S10 in FIG. 5. When the process of the flow chart shown in FIG. 6 is started, first, a process of acquiring a process value (an actual measurement value) or the like required for predicting the fluctuation of raw material conditions in advance is performed in the data acquirer 11 (step S11). Specifically, a process of acquiring data (such as a process value) is performed in the data acquirer 11 by communicating with the actual plant control system 110 through the communication interface 120. Meanwhile, the data E1 from the outer portion of the plant may be acquired through the communication interface 120 similarly, or may be acquired by input performed by an operator or the like.

Next, a process of storing the data (such as a process value) acquired in the data acquirer 11 is performed in the data storage 12 (step S12).

Next, a process of predicting the fluctuation of raw material conditions by performing statistical processing specified in advance using the data stored in the data storage 12 is performed in the fluctuation predictor 13 (step S13). For example, as shown in FIGS. 3A and 3B, the above-described statistical processing is performed using the data from the current point in time t0 to the point in time t1 traced back to the use time T1 stored in the parameter storage 16, and a process of predicting the fluctuation of raw material conditions from the current point in time t0 to the point in time t2 ahead by the prediction time T2 stored in the parameter storage 16 is performed in the fluctuation predictor 13 (step S13). Meanwhile, the above-described statistical processing is, for example, processing using a Kalman filter.

Subsequently, a process of comparing the prediction result of the fluctuation of raw material conditions obtained in the fluctuation predictor 13 with the actual measurement value of raw material conditions within the prediction time T2 which is a target, and determining whether a difference between the above prediction result and the above actual measurement value is equal to or less than the determination threshold TH stored in the parameter storage 16 is performed in the comparator 14 (step S14). In a case where it is determined that the above difference is larger than the determination threshold TH (in a case where a determination result is "NO"), the comparator 14 outputs a determination result indicating to that effect to the fluctuation predictor 13. In association therewith, the comparator 14 causes the fluctuation predictor 13 to change a method of predicting the fluctuation of raw material conditions (step S16), and then causes the fluctuation predictor 13 to perform the process of predicting the fluctuation of raw material conditions again (step S13).

On the other hand, in a case where it is determined that the difference between the above prediction result and the above actual measurement value is equal to or less than the determination threshold TH (in a case where a determination result is "YES"), a process of outputting the prediction result of the fluctuation of raw material conditions obtained in the fluctuation predictor 13 to the prediction result outputter 15 is performed by the comparator 14. A process of converting the prediction result of the fluctuation of raw material conditions obtained in the fluctuation predictor 13, as necessary, into a format appropriate to the on-line simulator 20 and outputting the converting format as the prediction data Y1 is performed in the prediction result outputter 15 (step S15).

Meanwhile, in step S16 described above, a process of changing a time range used in the prediction of the fluctuation of raw material conditions (the use time T1) in accordance with the setting data C1 which is input from the input device 40 (or set in advance), or output from the on-line simulator 20 is performed by the fluctuation predictor 13. For example, as described with reference to FIGS. 3A and 3B, a process of appropriately changing the time range used in the prediction of the fluctuation of raw material conditions (the use time T1) is performed in the fluctuation predictor 13.

In a case where the above-described processes are terminated, a process of simulating the behavior of a plant using the predicted fluctuation of raw material conditions and data obtained from a plant is performed in the on-line simulator 20 (step S20: a second step). Specifically, a process of acquiring the prediction data Y1 which is output from the condition fluctuation prediction device 10 is performed in the on-line simulator 20. In addition, a process of communicating with the actual plant control system 110 through the communication interface 120, and acquiring a process value, a PID set value, the amount of operation, or the like required for simulating the behavior of a plant as the data D2 is performed in the on-line simulator 20.

A process of simulating the behavior of a plant on-line using the acquired prediction data Y1 and the acquired data D2, and outputting the simulation result to the display device 30 is performed in the on-line simulator 20. The above-described processes are performed, whereby a result obtained by simulating the behavior of a plant performed in consideration of the fluctuation of conditions of a raw material that flows into the plant is displayed on the display device 30.

<Application Example of Plant Operation Support System>

Figure 7:
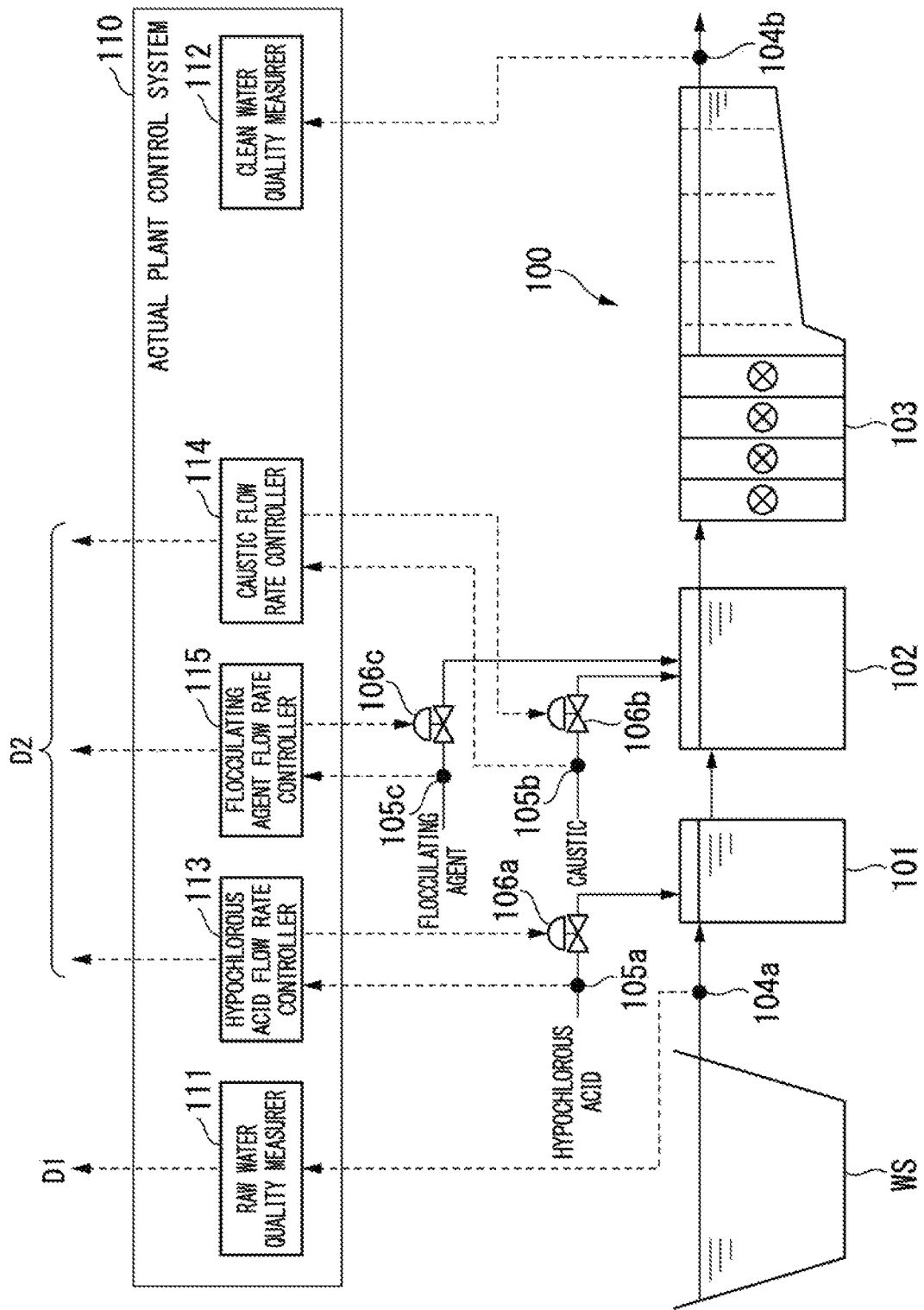
FIG. 7 is a diagram illustrating an example of a water treatment plant to which the plant operation support system according to an embodiment of the present invention is applied.

Next, an example in which the above-described plant operation support system 1 is applied to a water treatment plant will be described. FIG. 7 is a diagram illustrating an example of a water treatment plant to which the plant operation support system according to an embodiment of the present invention is applied. Meanwhile, in FIG. 7, components equivalent to the components shown in FIG. 1 are denoted by the same reference numerals and signs.

As shown in FIG. 7, the actual plant facility 100 provided in a water treatment plant includes a raw water receiving well unit 101, a mixing basin unit 102, a settling basin unit 103, water quality sensors 104a and 104b, flowmeters 105a to 105c, and valves 106a to 106c. Such an actual plant facility 100 treats water (raw water) obtained from a water source WS, and obtains purified water (clean water).

The raw water receiving well unit 101 is a unit for disinfecting raw water obtained from the water source WS. This raw water receiving well unit 101 is supplied with hypochlorous acid (such as, for example, hypochlorous acid sodium) which is a chemical for disinfecting raw water. The mixing basin unit 102 is a unit that adjusts the pH of water treated (disinfected) in the raw water receiving well unit 101, and flocculates particles included in water to form a clod (a flock). This mixing basin unit 102 is supplied with caustic (for example, caustic soda) which is a pH adjuster and a flocculating agent for flocculating particles included in water. The settling basin unit 103 is a unit for precipitating a flock obtained in the mixing basin unit 102, and separates supernatant water (clean water) and sludge.

The water quality sensor 104a is a sensor which is provided between the water source WS and the raw water receiving well unit 101 and provided in order to measure the quality of raw water obtained from the water source WS. The water quality sensor 104b is a sensor which is provided downstream of the settling basin unit 103 and provided in order to measure the quality of clean water that flows out of the settling basin unit 103.

The flowmeter 105a measures the flow rate of hypochlorous acid which is supplied to the raw water receiving well unit 101, the flowmeter 105b measures the flow rate of caustic which is supplied to the mixing basin unit 102, and the flowmeter 105c measures the flow rate of a flocculating agent which is supplied to the mixing basin unit 102. The valve 106a adjusts the flow rate of hypochlorous acid which is supplied to the raw water receiving well unit 101, the valve 106b adjusts the flow rate of caustic which is supplied to the mixing basin unit 102, and the valve 106c adjusts the flow rate of a flocculating agent which is supplied to the mixing basin unit 102.

The actual plant control system 110 provided in a water treatment plant includes a raw water quality measurer 111, a clean water quality measurer 112, a hypochlorous acid flow rate controller 113, a caustic flow rate controller 114, and a flocculating agent flow rate controller 115. Such an actual plant control system 110 obtains clean water from raw water obtained from the water source WS by controlling the actual plant facility 100 while referring to various types of process values obtained from the actual plant facility 100.

The raw water quality measurer 111 measures the quality of raw water using the detection result of the water quality sensor 104a. The measurement result of the raw water quality measurer 111 is transmitted to the condition fluctuation prediction device 10 as the data D1 by communication through the communication interface 120 between the condition fluctuation prediction device 10 and the actual plant control system 110 being performed. The clean water quality measurer 112 measures the quality of clean water using the detection result of the water quality sensor 104b. The quality of water which is measured in the raw water quality measurer 111 and the clean water quality measurer 112 is, for example, alkalinity, pH, turbidity, or the like.

The hypochlorous acid flow rate controller 113 controls the flow rate of hypochlorous acid which is supplied to the raw water receiving well unit 101 in accordance with the measurement result (for example, alkalinity) of the raw water quality measurer 111. The hypochlorous acid flow rate controller 113 controls the flow rate of hypochlorous acid which is supplied to the raw water receiving well unit 101 by adjusting the amount of operation of the valve 106a while referring to the measurement result of the flowmeter 105a.

The caustic flow rate controller 114 controls the flow rate of caustic which is supplied to the mixing basin unit 102 in accordance with the measurement result (for example, pH) of the raw water quality measurer 111. The caustic flow rate controller 114 controls the flow rate of caustic which is supplied to the mixing basin unit 102 by adjusting the amount of operation of the valve 106$b$ while referring to the measurement result of the flowmeter 105$b$.

The flocculating agent flow rate controller 115 controls the flow rate of a flocculating agent which is supplied to the mixing basin unit 102 in accordance with the measurement result (for example, turbidity) of the raw water quality measurer 111. The flocculating agent flow rate controller 115 controls the flow rate of a flocculating agent which is supplied to the mixing basin unit 102 by adjusting the amount of operation of the valve 106$c$ while referring to the measurement result of the flowmeter 105$c$.

Various types of data (such as a process value, a HD set value, and the amount of operation) used for control in the hypochlorous acid flow rate controller 113, the caustic flow rate controller 114, and the flocculating agent flow rate controller 115 are transmitted to the on-line simulator 20. Specifically, various types of data are transmitted to the on-line simulator 20 as the data D2 by communication through the communication interface 120 between the on-line simulator 20 and the actual plant control system 110 being performed.

Figure 8:
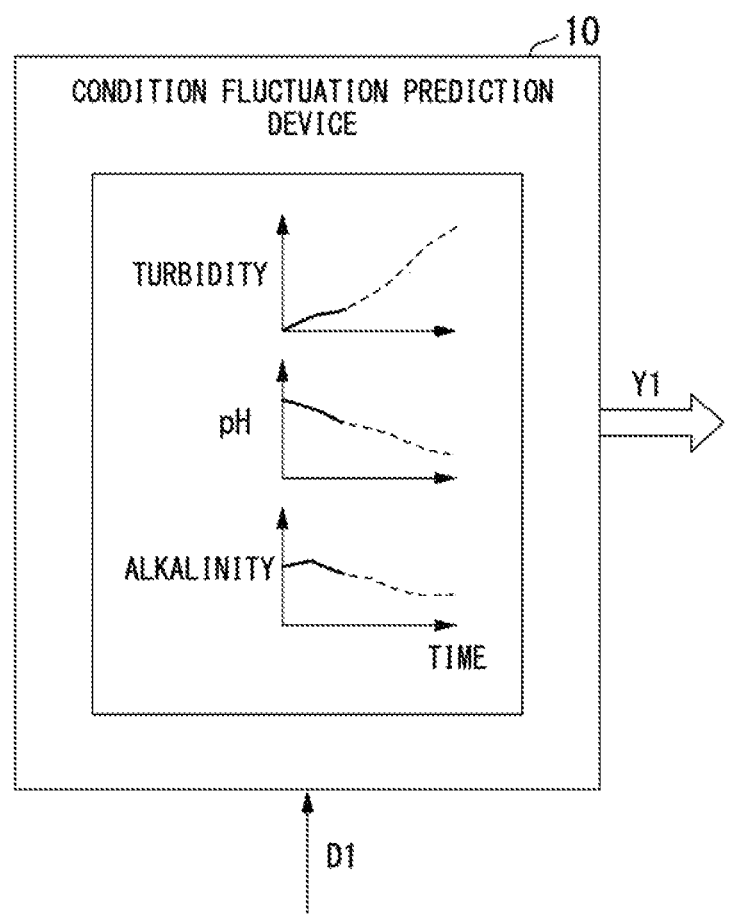
FIG. 8 is a diagram schematically illustrating the condition fluctuation prediction device applied to the water treatment plant in an embodiment of the present invention.

FIG. 8 is a diagram schematically illustrating the condition fluctuation prediction device applied to the water treatment plant in an embodiment of the present invention. As shown in FIG. 8, the condition fluctuation prediction device 10 applied to the water treatment plant acquires the data D1 indicating the measurement result of the quality of raw water which is transmitted from the actual plant control system 110. Here, the data D1 includes, a measurement result such as, for example, alkalinity, pH, or turbidity as the measurement result of the quality of raw water. Meanwhile, the acquisition of the data D1 by the condition fluctuation prediction device 10 is performed at a time interval specified in advance (for example, 10 minutes).

The condition fluctuation prediction device 10 predicts the fluctuation of the quality of raw water which is a raw material that flows into the water treatment plant using the acquired data D1 indicating the measurement result of the quality of raw water. In the example shown in FIG. 8, a state in which the fluctuation of the quality of raw water is predicted is represented by graphs shown within the condition fluctuation prediction device 10 (a graph indicating a change over time in alkalinity, a graph indicating a change over time in pH, and a graph indicating a change over time in turbidity).

In each of these graphs, a portion shown by a solid line represents the measurement result of the quality of raw water obtained in the past, and a portion shown by a dotted line represents the predicted fluctuation of the quality of raw water. Meanwhile, in each of the graphs shown in FIG. 8, a boundary between a portion shown by a solid line and a portion shown by a dotted line on the horizontal axis represents the current point in time. The condition fluctuation prediction device 10 converts a portion shown by a dotted line on the graph shown in FIG. 8 (that is, a portion indicating the predicted fluctuation of the quality of raw water) into a format appropriate to the on-line simulator 20 and outputs the converted format as the prediction data Y1.

Here, a simulation has been performed with a fixed value in an on-line simulator of the related art. However, in reality, as shown in FIG. 8, there is a change as in the solid line portion on the graph (an actual measurement value, the past to the present), and there is also room for the future value to change as shown by a dotted line on the graph. Particularly, in the case of the water treatment plant shown in the present example, a precipitation process is also included, and thus a process from input of raw water to output of clean water has a very large time constant. In such a case, when a simulation using a fixed value and an actual plant process are performed without assuming a change of input data, both control of a process (the amount of chemical injection or a timing) and output of a result (for example, the quality of clean water) become inappropriate.

Consequently, a higher-accuracy simulation is performed by predicting a fluctuation component as input of a simulation, and inserting and inputting a change. For example, the future turbidity (dotted line) increases as shown in FIG. 8, whereas excess or deficiency occurs in the amount of chemical injection in a simulation based on a fixed value into which such an increase is not inserted, and generated clean water may become turbid. In the present invention, both a process (for example, the amount of chemical injection) and output (the quality of clean water) can be made appropriate by performing a simulation on the prediction result of a fluctuation in the quality of raw water.

Figure 9:
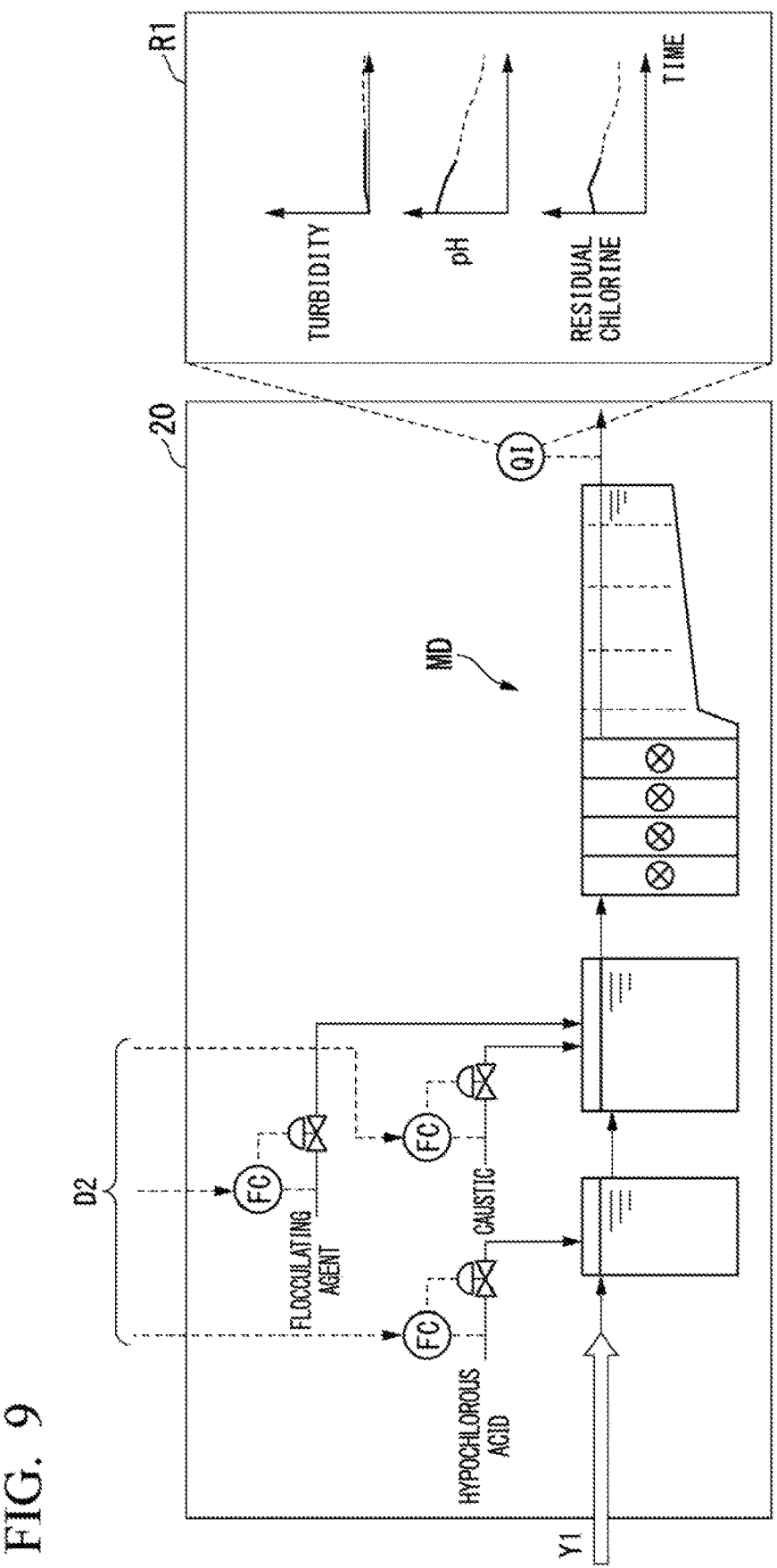
FIG. 9 is a diagram schematically illustrating an on-line simulator applied to the water treatment plant in an embodiment of the present invention.

FIG. 9 is a diagram schematically illustrating an on-line simulator applied to the water treatment plant in an embodiment of the present invention. As shown in FIG. 9, a plant model MD of the actual plant facility 100 shown in FIG. 7 is stored in the on-line simulator 20 applied to the water treatment plant. Meanwhile, the plant model MD is created in advance using, for example, an engineering device which is not shown, and is stored in the on-line simulator 20.

The on-line simulator 20 acquires the prediction data Y1 indicating the prediction result of a fluctuation in the quality of raw water from the condition fluctuation prediction device 10. Meanwhile, the prediction data Y1 includes, for example, the prediction result of a fluctuation in alkalinity, pH, turbidity or the like as the prediction result of a fluctuation in the quality of raw water. In addition, the on-line simulator 20 acquires the data D2 including various types of data used for control which are transmitted from the actual plant control system 110. Meanwhile, the data D2 includes a process value, a PID set value, the amount of operation, or the like.

The on-line simulator 20 inputs the acquired prediction data Y1 indicating the prediction result of a fluctuation in the quality of raw water and the acquired data D2 including various types of data used for control to the plant model MD. The state of a control loop of the actual plant control system 110 is equalized with the plant model MD, and the behavior of the water treatment plant (the actual plant facility 100) is simulated.

The on-line simulator 20 calculates the following in the respective units (the raw water receiving well unit 101, the mixing basin unit 102, and the settling basin unit 103), specifically, using the prediction result of a fluctuation in the quality of raw water and the state of a control loop as input.

Resource revenue and expenditure of an actual plant facility (a water purification plant facility)

Chemical reaction based on a change in resource revenue and expenditure, facility chemical resistance concentration and the dynamic behavior of water quality In the example shown in FIG. 9, simulation results R1 of the on-line simulator 20 are represented by graphs (a graph indicating a change over time in residual chlorine, a graph indicating a change over time in pH, and a graph indicating a change over time in turbidity). In each of these graphs, a portion shown by a solid line represents the measurement result of the quality of clean water obtained in the past, and a portion shown by a dotted line represents the prediction result of the quality of clean water obtained by a simulation. Meanwhile, in each graph shown in FIG. 9, a boundary between a portion shown by a solid line and a portion shown by a dotted line in the direction of the horizontal axis (time axis) represents the current point in time. The on-line simulator 20 outputs the simulation results R1 shown in FIG. 9 to the display device 30. The simulation results R1 of the on-line simulator 20 are displayed on the display device 30.

As described above, in the present embodiment, the condition fluctuation prediction device 10 of the plant operation support system 1 predicts the fluctuation of conditions of a raw material that flows into a plant using data obtained from the plant. The on-line simulator 20 simulates the behavior of a plant using the fluctuation of raw material conditions predicted by the condition fluctuation prediction device 10 and the data obtained from the plant. Thereby, it is possible to simulate the behavior of a plant with a high degree of accuracy even in a case where conditions of a raw material that flows into the plant fluctuate.

<Mounting Example>

Figure 10:
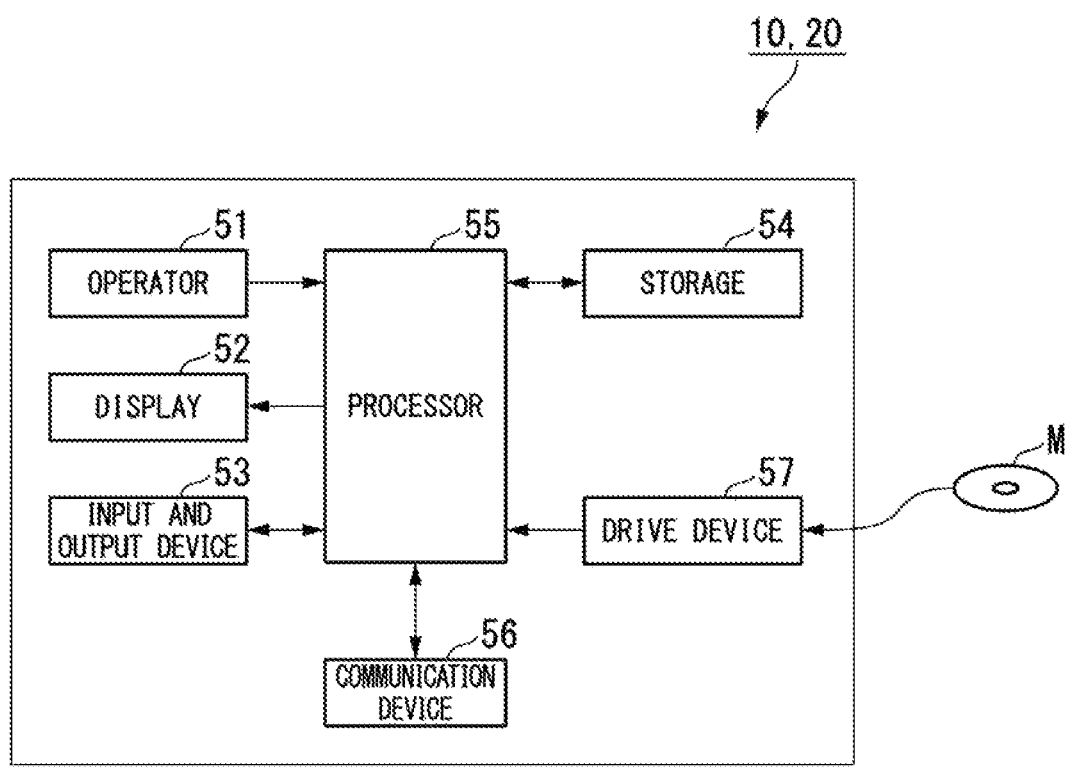
FIG. 10 is a block diagram illustrating a mounting example of the condition fluctuation prediction device and the on-line simulator which are included in the plant operation support system according to an embodiment of the present invention.

FIG. 10 is a block diagram illustrating a mounting example of the condition fluctuation prediction device and the on-line simulator which are included in the plant operation support system according to an embodiment of the present invention. As shown in FIG. 10, the condition fluctuation prediction device 10 and the on-line simulator 20 can be realized by, for example, a computer including an operator 51, a display 52, an input and output device 53, a storage 54, a processor 55, a communication device 56, a drive device 57, and the like. Meanwhile, the functions of the condition fluctuation prediction device 10 and the on-line simulator 20 are realized through software by reading out and installing a program recorded in a recording medium M. Alternatively, the functions are realized through software by installing a program downloaded through a network which is not shown.

The operator 51 includes an input device such as, for example, a keyboard or a pointing device, and outputs an instruction according to an operation performed by a user who uses the condition fluctuation prediction device 10 or the on-line simulator 20 to the processor 55. The display 52 includes a display device such as, for example, a liquid crystal display, and displays various types of information which are output from the processor 55. Meanwhile, the operator 51 and the display 52 may be physically separated from each other, or may be physically formed integrally with each other like a liquid crystal display of a touch panel type having both a display function and an operation function.

The input and output device 53 inputs and outputs various types of information under the control of the processor 55. For example, the input and output device 53 may input and output various types of information by performing communication with an external instrument, or may input and output various types of information by reading out or writing various types of information from or to a detachable recording medium (for example, a non-volatile memory). Meanwhile, the communication with an external instrument may be either cable communication or wireless communication.

The storage 54 includes an auxiliary storage device such as, for example, a hard disk drive (HDD) or a solid-state drive (SSD), and stores various types of information. For example, the storage 54 may store the data D1 acquired by the data acquirer 11. That is, the function of the data storage 12 shown in FIG. 2 may be realized by the storage 54. In addition, the storage 54 may store, for example, various types of programs which are executed by the condition fluctuation prediction device 10 or the on-line simulator 20.

The processor 55 performs various types of processes on the basis of an instruction from the operator 51. The processor 55 outputs results of various types of processes to the display 52, the input and output device 53, or the communication device 56, or causes the storage 54 to store the results. This processor 55 is provided with main functions of the condition fluctuation prediction device 10 (the fluctuation predictor 13, the comparator 14, and the like), or main functions of the on-line simulator 20. The functions provided in the processor 55 are realized by programs for realizing the functions being executed by hardware such as a central processing unit (CPU). That is, the main functions of the condition fluctuation prediction device 10 or the main functions of the on-line simulator 20 are realized by software and hardware resources in cooperation.

The communication device 56 performs communication through, for example, a network which is not shown under the control of the processor 55. Meanwhile, the communication device 56 may perform cable communication, or may perform wireless communication. The drive device 57 reads out data which is recorded in a computer readable recording medium M such as, for example, a CD-ROM or a DVD (registered trademark)-ROM. This recording medium M stores programs for realizing main functions of the condition fluctuation prediction device 10 or main functions of the on-line simulator 20.

Meanwhile, the mounting example shown in FIG. 10 is merely an example, and it should be noted that the mounting of the condition fluctuation prediction device 10 or the on-line simulator 20 is not limited to that shown in FIG. 10. For example, the condition fluctuation prediction device 10 and the on-line simulator 20 may be realized by one computer, or may be realized by a plurality of different computers. In addition, the programs for realizing main functions of the condition fluctuation prediction device 10 or main functions of the on-line simulator 20 are not necessarily distributed in a state of being stored in the recording medium M. The programs may be distributed through a network such as, for example, the Internet.

Hereinbefore, although the plant operation support system and the plant operation support method according to an embodiment of the present invention have been described, the present invention is not limited to the above embodiment, and can be freely changed within the scope of the present invention. For example, in the above embodiment, the fluctuation of conditions of one raw material that flows into a plant is predicted, but the fluctuation of conditions of a plurality of raw materials that flow into a plant may be predicted.

In addition, any fluctuation components such as not only a raw material but also energy conditions used in a plant process (for example, a change in the amount of supply due to use of natural energy or a storage battery) can be applied. In a case where such prediction is performed, a plurality of condition fluctuation prediction devices may be prepared. For example, a condition fluctuation prediction device may be prepared for each raw material that flows into a plant. Thereby, even in a complex plant in which conditions of a plurality of raw materials fluctuate, it is possible to simulate the behavior of the plant with a high degree of accuracy.

In addition, in the above embodiment, the condition fluctuation prediction device 10 predicts the fluctuation of raw material conditions which are input to the on-line simulator 20. However, the condition fluctuation prediction device 10 can also be used in application for predicting the fluctuation of raw material conditions which are input to an off-line simulator such as a simulator for operator training. Thereby, it is also possible to perform a more realistic simulation or training by using the fluctuation of raw material conditions as input data on occasion of use of the off-line simulator.

In addition, in the above embodiment, the simulation result of the on-line simulator 20 is displayed on the display device 30, but the prediction result of the condition fluctuation prediction device 10 may be displayed on the display device 30 or the like. Meanwhile, the prediction result of the condition fluctuation prediction device 10 may be displayed as switchable with the simulation result of the on-line simulator 20, or may be displayed together with the simulation result of the on-line simulator 20.

Figure 11:
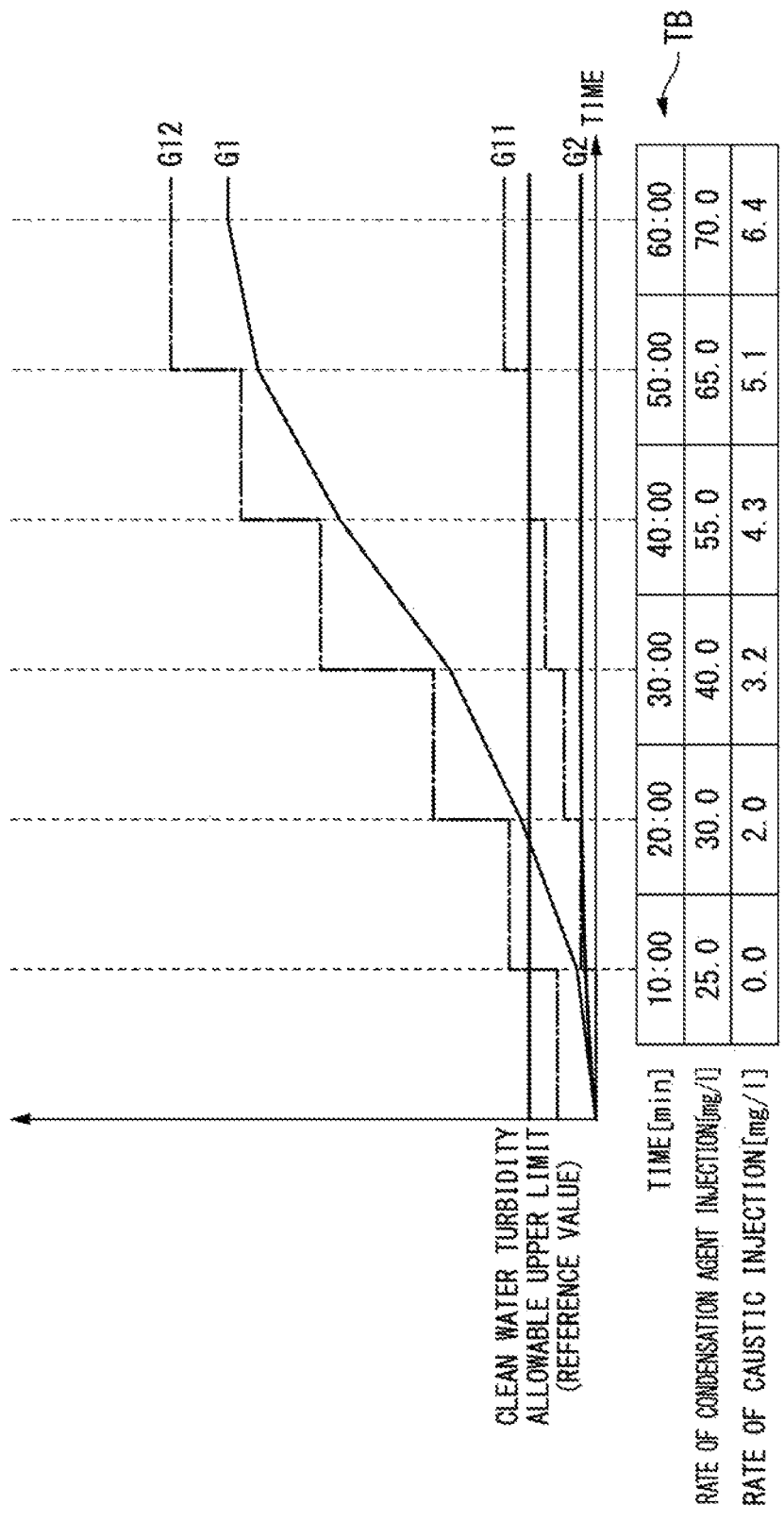
FIG. 11 is a diagram illustrating a display example of prediction results of the condition fluctuation prediction device.

FIG. 11 is a diagram illustrating a display example of prediction results of the condition fluctuation prediction device. The example shown in FIG. 11 displays a graph G1 indicating a change over time in the turbidity of raw water predicted by the condition fluctuation prediction device 10, a graph G11 indicating the set value of a proper rate of caustic injection according to the predicted turbidity of raw water, and a graph G12 indicating the set value of a rate of flocculating agent injection. Meanwhile, the example shown in FIG. 11 also displays a table TB indicating changes over time in graphs G11 and G12.

Further, the example shown in FIG. 11 also displays a graph G2 indicating a change over time in the turbidity of clean water which is simulated in a case where the set values of a rate of caustic injection and a rate of flocculating agent injection shown in the graphs G11 and G12 and the table TB are applied. Meanwhile, the set values of a rate of caustic injection and a rate of flocculating agent injection shown in the graphs G11 and G12 and the table TB, and a change over time in the turbidity of clean water shown in the graph G2 may be obtained in, for example, the on-line simulator 20.

An operator of the water treatment plant can easily ascertain how the turbidity of raw water changes by reference to the graph G1. In addition, the operator of the water treatment plant can easily ascertain measures required for decreasing the turbidity of raw water (when and how much caustic or a flocculating agent may be injected) by reference to the graphs G11 and G12 and the table TB. Further, the operator of the water treatment plant can also ascertain an effect in the case of performance referring to the graphs G11 and G12 and the table TB (the turbidity of clean water being maintained or further reduced in a state of being low) by reference to the graph G2.

Meanwhile, the set values of a rate of caustic injection and a rate of flocculating agent injection shown in the graphs G11 and G12 and the table TB may be output from the on-line simulator 20 to the actual plant control system 110, and be automatically controlled. Meanwhile, the output of the set values from the on-line simulator 20 to the actual plant control system 110 may be automatically performed, or may be performed in a case where there is an instruction from a plant operator.

Supplementary Note

According to an aspect of the present invention, there is provided a plant operation support system (1) that supports an operation of a plant, the plant operation support system including: a fluctuation prediction device (10) configured to predict a fluctuation of an element which is input to the plant; and a simulation device (20) configured to simulate a behavior of the plant using a fluctuation (Y1) of the element predicted by the fluctuation prediction device and data (D2) which is obtained from the plant.

In addition, in the plant operation support system according to an aspect of the present invention, the fluctuation prediction device is configured to predict the fluctuation of the element by performing statistical processing specified in advance with respect to the data which is obtained from the plant.

In addition, in the plant operation support system according to an aspect of the present invention, the fluctuation prediction device is configured to change a method of predicting the fluctuation of the element in a case where a difference between a prediction result of the fluctuation of the element and an actual measurement value of the element exceeds a threshold (TH) specified in advance.

In addition, in the plant operation support system according to an aspect of the present invention, the fluctuation prediction device is able to individually set a first time (T1) for specifying a range of data which is used for prediction of the fluctuation of the element and a second time (T2) for specifying a range for performing the prediction of the fluctuation of the element, among the data obtained from the plant.

In addition, in the plant operation support system according to an aspect of the present invention, in a case where a time range specified by the second time and a time range in which the simulation device simulates the behavior of the plant are different from each other, the fluctuation prediction device predicts the fluctuation of the element by adjusting the time range specified in the second time with respect to the time range in which the simulation device simulates the behavior of the plant.

In addition, in the plant operation support system according to an aspect of the present invention, the element which is input to the plant is a raw material that flows into the plant.

In addition, in the plant operation support system according to an aspect of the present invention, the plant is a water treatment plant which treats raw water obtained from a water source, and the fluctuation prediction device is configured to predict a fluctuation of a quality of the raw water.

In addition, in the plant operation support system according to an aspect of the present invention, the quality of the raw water includes at least one of alkalinity, pH, or turbidity.

In addition, in the plant operation support system according to an aspect of the present invention, the fluctuation prediction device is configured to acquire measurement data indicating a measurement result of the quality of raw water from an actual plant control system which controls the water treatment plant, and the fluctuation prediction device is configured to predict the fluctuation of the quality of raw water using the measurement data.

In addition, in the plant operation support system according to an aspect of the present invention, the fluctuation prediction device is configured to output prediction data indicating the predicted fluctuation of the quality of the raw water to the simulation device.

According to an aspect of the present invention, there is provided a plant operation support method performed by a plant operation support system that comprises a fluctuation prediction device and a simulation device and supports an operation of a plant, the plant operation support method including: predicting, by the fluctuation prediction device, a fluctuation of an element which is input to the plant; and simulating, by the simulation device, a behavior of the plant using a fluctuation of the element predicted by the fluctuation prediction device and data which is obtained from the plant.

In addition, the plant operation support method according to an aspect of the present invention further includes: predicting, by the fluctuation prediction device, the fluctuation of the element by performing statistical processing specified in advance with respect to the data which is obtained from the plant.

In addition, the plant operation support method according to an aspect of the present invention further includes: changing, by the fluctuation prediction device, a method of predicting the fluctuation of the element in a case where a difference between a prediction result of the fluctuation of the element and an actual measurement value of the element exceeds a threshold specified in advance.

In addition, the plant operation support method according to an aspect of the present invention further includes: individually setting, by the fluctuation prediction device, a first time for specifying a range of data which is used for prediction of the fluctuation of the element and a second time for specifying a range for performing the prediction of the fluctuation of the element, among the data obtained from the plant.

In addition, the plant operation support method according to an aspect of the present invention further includes: in a case where a time range specified by the second time and a time range in which the simulation device simulates the behavior of the plant are different from each other, predicting, by the fluctuation prediction device, the fluctuation of the element by adjusting the time range specified in the second time with respect to the time range in which the simulation device simulates the behavior of the plant.

In addition, in the plant operation support method according to an aspect of the present invention, the element which is input to the plant is a raw material that flows into the plant.

In addition, in the plant operation support method according to an aspect of the present invention, the plant is a water treatment plant which treats raw water obtained from a water source, and the plant operation support method further includes: predicting, by the fluctuation prediction device, a fluctuation of a quality of the raw water.

In addition, in the plant operation support method according to an aspect of the present invention, the quality of the raw water includes at least one of alkalinity, pH, or turbidity.

In addition, the plant operation support method according to an aspect of the present invention further includes: acquiring, by the fluctuation prediction device, measurement data indicating a measurement result of the quality of raw water from an actual plant control system which controls the water treatment plant; and predicting, by the fluctuation prediction device, the fluctuation of the quality of raw water using the measurement data.

In addition, the plant operation support method according to an aspect of the present invention further includes: outputting, by the fluctuation prediction device, prediction data indicating the predicted fluctuation of the quality of the raw water to the simulation device.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A plant operation support system comprising a non-transitory storage storing a program which, when executed by at least one hardware processor, causes the at least one hardware processor to at least:
   predict a fluctuation of an element which is input to a plant; and
   simulate a behavior of the plant from a simulation start time to a simulation end point in time using the fluctuation of the element that is predicted and data which is obtained from the plant, the simulation start time being coincident with a current point in time or a time after the current point in time, the simulation end point in time being after the simulation start time by a simulation time,
   wherein predicting the fluctuation of the element comprises:
      setting a first time for specifying a range of data which is used for prediction of the fluctuation of the element;
      obtaining a prediction result for the fluctuation of the element from the current point in time to a prediction end point in time using the data from the current point in time to a point in time traced back to the first time, the prediction end point in time being after the current point in time by a second time;
      changing the first time so that an irregularity is not included in the data which is used for predicting when a difference between the prediction result of the fluctuation of the element and an actual measurement value of the element exceeds a threshold specified in advance; and
      predicting a new fluctuation of the element using the data from the current point in time back to the changed first time,
   wherein simulating the behavior of the plant comprises:
      setting the simulation time so that the simulation end point in time does not exceed the prediction end point in time;
      simulating the behavior of the plant in accordance with the set simulation time, using the new fluctuation of the element that is predicted and the data which is obtained from the plant; and
      outputting a simulation result of the behavior of the plant to a display device to cause the display device to display the simulation result, and
   wherein the element is a supply amount of energy that fluctuates and is supplied to the plant and used in a process of the plant.

2. The plant operation support system according to claim 1,
wherein the program, when executed by the at least one hardware processor, causes the at least one hardware processor to predict the fluctuation of the element by performing statistical processing specified in advance with respect to the data which is obtained from the plant.

3. The plant operation support system according to claim 1,
wherein when a first time range specified by the second time is different from a second time range in which the behavior of the plant is simulated, the at least one hardware processor predicts the fluctuation of the element by adjusting the first time range with respect to the second time range.

4. The plant operation support system according to claim 1,
wherein the element which is input to the plant is a raw material that flows into the plant.

5. The plant operation support system according to claim 1,
wherein the plant is a water treatment plant which treats raw water obtained from a water source, and
wherein the fluctuation of the element is a fluctuation of a quality of the raw water.

6. The plant operation support system according to claim 5,
wherein the quality of the raw water includes at least one of alkalinity, pH, or turbidity.

7. The plant operation support system according to claim 5,
wherein the program, when executed by the at least one hardware processor, causes the at least one hardware processor to:
acquire measurement data indicating a measurement result of the quality of the raw water from an actual plant control system which controls the water treatment plant; and
predict the fluctuation of the quality of the raw water using the measurement data.

8. The plant operation support system according to claim 5,
wherein the program, when executed by the at least one hardware processor, causes the at least one hardware processor to output prediction data indicating the predicted fluctuation of the quality of the raw water.

9. The plant operation support system according to claim 1, wherein the irregularity is a peak in the data.

10. A plant operation support method comprising:
predicting, by at least one hardware processor, a fluctuation of an element which is input to a plant; and
simulating, by the at least one hardware processor, a behavior of the plant from a simulation start time to a simulation end point in time using the fluctuation of the element that is predicted and data which is obtained from the plant, the simulation start time being coincident with a current point in time or a time after the current point in time, the simulation end point in time being after the simulation start time by a simulation time,
wherein predicting the fluctuation of the element comprises:
setting, by the at least one hardware processor, a first time for specifying a range of data which is used for prediction of the fluctuation of the element;
obtaining, by the at least one hardware processor, a prediction result for the fluctuation of the element from the current point in time to a prediction end point in time using the data from the current point in time to a point in time traced back to the first time, the prediction end point in time being after the current point in time by a second time;
changing, by the at least one hardware processor, the first time so that an irregularity is not included in the data which is used for predicting when a difference between the prediction result of the fluctuation of the element and an actual measurement value of the element exceeds a threshold specified in advance; and
predicting, by the at least one hardware processor, a new fluctuation of the element using the data from the current point in time back to the changed first time,
wherein simulating the behavior of the plant comprises:
setting, by the at least one hardware processor, the simulation time so that the simulation end point in time does not exceed the prediction end point in time;
simulating, by the at least one hardware processor, the behavior of the plant in accordance with the set simulation time, using the fluctuation of the element that is predicted and the data which is obtained from the plant; and
outputting a simulation result of the behavior of the plant to a display device to cause the display device to display the simulation result, and
wherein the element is a supply amount of energy that is fluctuate and supplied to the plant and used in a processes of the plant.

11. The plant operation support method according to claim 10, further comprising:
predicting, by the at least one hardware processor, the fluctuation of the element by performing statistical processing specified in advance with respect to the data which is obtained from the plant.

12. The plant operation support method according to claim 10, further comprising:
when a first time range specified by the second time is different from a second time range in which the behavior of the plant is simulated, predicting, by the at least one hardware processor, the fluctuation of the element by adjusting the first time range with respect to the second time range.

13. The plant operation support method according to claim 10,
wherein the element which is input to the plant is a raw material that flows into the plant.

14. The plant operation support method according to claim 10,
wherein the plant is a water treatment plant which treats raw water obtained from a water source, and
wherein the fluctuation of the element is a fluctuation of a quality of the raw water.

15. The plant operation support method according to claim 14,
wherein the quality of the raw water includes at least one of alkalinity, pH, or turbidity.

16. The plant operation support method according to claim 14, further comprising:
acquiring, by the at least one hardware processor, measurement data indicating a measurement result of the quality of the raw water from an actual plant control system which controls the water treatment plant; and predicting, by the at least one hardware processor, the fluctuation of the quality of the raw water using the measurement data.

17. The plant operation support method according to claim 14, further comprising:

outputting, by the at least one hardware processor, prediction data indicating the predicted fluctuation of the quality of the raw water.

18. The plant operation support method according to claim 10, wherein the irregularity is a peak in the data.

* * * * *